US012689877B2

(12) United States Patent
Ferone et al.

(10) Patent No.: US 12,689,877 B2
(45) Date of Patent: Jul. 21, 2026

(54) VEHICLE COMMUNICATION USING LIGHT PROJECTIONS

(71) Applicant: Toyota Motor Engineering & Manufacturing North America, Inc., Plano, TX (US)

(72) Inventors: Christopher Anthony Ferone, Ann Arbor, MI (US); Shaurya Panthri, Ann Arbor, MI (US); Brian T. Clayson, South Lyon, MI (US); Paul T. Fanson, Howell, MI (US); Akila C. Ganlath, Fremont, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 239 days.

(21) Appl. No.: 18/236,934

(22) Filed: Aug. 22, 2023

(65) Prior Publication Data

US 2025/0071528 A1 Feb. 27, 2025

(51) Int. Cl.
*H04W 4/46* (2018.01)
*B60Q 1/00* (2006.01)
(Continued)

(52) U.S. Cl.
CPC ............ *H04W 4/46* (2018.02); *B60Q 1/0023* (2013.01); *B60Q 1/444* (2013.01); *B60Q 1/46* (2013.01);
(Continued)

(58) Field of Classification Search
CPC ....... H04W 4/46; B60Q 1/544; B60Q 1/0023; B60Q 1/444; B60Q 1/46; B60Q 1/52; B60W 30/18109
(Continued)

(56) References Cited

U.S. PATENT DOCUMENTS 7,137,674 B2 11/2006 Goebels
8,274,397 B2 9/2012 Wilson et al.
(Continued)

FOREIGN PATENT DOCUMENTS

CN 114268369 A 4/2022
DE 102020000438 A1 10/2020
DE 102020007441 A1 4/2021

OTHER PUBLICATIONS

Noof Al Abdulsalam et al., Design and Implementation of a Vehicle to Vehicle Communication System Using Li-Fi Technology, 2015, International Conference on Information and Communication Technology Research, pp. 136-139.*
(Continued)

*Primary Examiner* — Manglesh M Patel
(74) *Attorney, Agent, or Firm* — Snell & Wilmer LLP

(57) ABSTRACT

Methods, systems, and apparatus for a system that communicates with other vehicles using light signals. The system includes one or more light emitters coupled to a vehicle and an electronic control unit coupled to the light emitter(s). The electronic control unit is configured to encode a message using a communication protocol to create a first light pattern. The electronic control unit is further configured to generate a light pattern using the light emitter(s) to communicate the message to an adjacent vehicle. The message indicates vehicle, passenger, and/or roadway conditions to provide the adjacent vehicle real-time conditions, which can be used to provide immediate feedback that the adjacent vehicle can use to safely control one or more aspects of the adjacent vehicle.

16 Claims, 4 Drawing Sheets

(51) Int. Cl.

| | |
|---|---|
| B60Q 1/44 | (2006.01) |
| B60Q 1/46 | (2006.01) |
| B60Q 1/50 | (2006.01) |
| B60Q 1/52 | (2006.01) |
| B60W 30/18 | (2012.01) |

(52) U.S. Cl.
CPC .............. B60Q 1/52 (2013.01); B60Q 1/544 (2022.05); B60W 30/18109 (2013.01)

(58) Field of Classification Search
USPC ........................................................... 701/1
See application file for complete search history.

(56) References Cited

U.S. PATENT DOCUMENTS

| | | | |
|---|---|---|---|
| 9,527,394 B1 | 12/2016 | Tang et al. | |
| 9,970,615 B1 | 5/2018 | Cardillo et al. | |
| 10,019,002 B2 | 7/2018 | Harnett et al. | |
| 10,532,826 B2 | 1/2020 | Wise | |
| 10,567,079 B1* | 2/2020 | Inskeep ................. | H03M 13/09 |
| 10,816,635 B1 | 10/2020 | Newman et al. | |
| 10,887,023 B1* | 1/2021 | Leefer ................. | G05D 1/0293 |
| 11,345,279 B2 | 5/2022 | Kopp | |
| 11,364,885 B2 | 6/2022 | Viele | |
| 11,927,673 B1* | 3/2024 | Jalali ...................... | G01S 7/006 |
| 2006/0273926 A1* | 12/2006 | Schwartz ................. | G08G 1/07 |
| | | | 340/907 |
| 2008/0122606 A1* | 5/2008 | Bradley .............. | B60Q 1/0017 |
| | | | 340/468 |
| 2013/0058111 A1* | 3/2013 | Ekladyous ............. | G01B 21/24 |
| | | | 362/460 |

| | | | |
|---|---|---|---|
| 2015/0088373 A1* | 3/2015 | Wilkins ............... | G05D 1/0293 |
| | | | 701/36 |
| 2016/0189146 A1* | 6/2016 | Cattone .............. | G06Q 20/3829 |
| | | | 398/128 |
| 2016/0217687 A1* | 7/2016 | Rous .................... | H04B 10/116 |
| 2016/0231746 A1* | 8/2016 | Hazelton .............. | G05D 1/0274 |
| 2017/0330464 A1* | 11/2017 | Yoo .......................... | B60T 7/22 |
| 2017/0334340 A1* | 11/2017 | Madril .................. | B60K 37/00 |
| 2018/0233816 A1 | 8/2018 | Barber et al. | |
| 2018/0292513 A1* | 10/2018 | Bidner ................... | G01S 17/58 |
| 2019/0052359 A1* | 2/2019 | Brady ................... | B60Q 1/444 |
| 2020/0177276 A1* | 6/2020 | Lakshmanan ........ | H04B 10/112 |
| 2020/0280829 A1* | 9/2020 | Benefield ............... | H04W 4/46 |
| 2020/0348689 A1* | 11/2020 | McEnroe ............ | G05D 1/0276 |
| 2021/0300423 A1 | 9/2021 | Ahire et al. | |
| 2021/0328828 A1 | 10/2021 | Szemes et al. | |
| 2024/0265803 A1* | 8/2024 | Muthupalaniappan ...................... | |
| | | | H04B 10/116 |
| 2024/0367580 A1* | 11/2024 | Popiel ................... | G06Q 30/06 |
| 2025/0020776 A1* | 1/2025 | Herman .................. | B60T 7/12 |

OTHER PUBLICATIONS

Jong-Ho Yoo et al., Demonstration of Vehicular Visible Light Communication Based on LED Headlamp, 2013, IEEE, pp. 465-467.*

M.A. Ilyas et al., Two Toys Vehicles Interactions Using Communication Protocol for Visible Light Communication, 2016, IEEE, pp. 1-6 (pdf).*

Anushka A Muragod et al., Development of An Efficient Communication System using VLC and Li-Fi, Dec. 2024, IJIRT, pp. 2143-2148.*

* cited by examiner

VEHICLE COMMUNICATION USING LIGHT PROJECTIONS

BACKGROUND

1. Field

This specification relates generally to vehicle-to-vehicle communication, and more particularly, to sending and receiving messages between vehicles using optical signals.

2. Description of the Related Art

Many accidents occur when a vehicle changes, moves, or merges into another lane. Accidents can also occur due to foreign objects being located in the roadway. These foreign objects can be blocked from view of a vehicle until the vehicle has reached, or nearly reached, the foreign object and there is insufficient time to safely decelerate or safely maneuver around the foreign object, for example the foreign object can be blocked from view by traffic. Some vehicles can display hazard lights to indicate to approaching vehicles that a hazard is present, though it is not always clear to the approaching vehicles the nature of the hazard. Vehicles can also display brake lights to indicate that the vehicle is slowing, though it is not always clear to the approaching vehicles the magnitude of deceleration of the slowing vehicle. Moreover, the reaction time of a human can be slower than the reaction time of a machine.

Accordingly, there is a need for a system and method for preparing the vehicle to safely avoid obstacles (e.g., traffic, foreign objects, etc.) and minimize vehicle response time.

Communicating messages from one vehicle to another vehicle can be difficult when the vehicles are not wirelessly connected to each other, when vehicles do not have the capability of receiving electronic messages, etc.

Accordingly, there is a need to send and receive messages between vehicles using existing vehicle hardware.

SUMMARY

In general, one aspect of the subject matter described in this specification is embodied in a system for vehicle-to-vehicle communication. The system includes a first light emitter coupled to a vehicle. The system further includes an electronic control unit (ECU) coupled to the first light emitter. The ECU is configured to encode a message using a communication protocol to create a first light pattern. The ECU is further configured to generate the first light pattern using the first light emitter to communicate the message to an adjacent vehicle.

These and other embodiments may optionally include one or more of the following features. The communication protocol can be a binary communication protocol.

The first light emitter can be configured to emit a non-visible light. The first light emitter can be configured to emit a non-visible light (e.g., an infrared light).

The first light emitter can be at least one of a head light for the vehicle, a running light for the vehicle, a brake light for the vehicle, a hazard light for the vehicle, or a turn signal light for the vehicle.

The first light emitter can be a head light, and the message can include a notification of a presence of an emergency vehicle and/or an intention of the vehicle to pass a lead vehicle.

The first light emitter can be a brake light, and the message can include a reason for a braking maneuver, a deceleration rate of the vehicle, a level of urgency in braking, and/or an indication of an upcoming road hazard.

The first light emitter can be a hazard light, and the message can include a reason for why the hazard light is activated, an indication of an upcoming road hazard, an indication of a medical emergency of a passenger in the vehicle, and/or an indication that the vehicle is stopped.

The first light emitter can be a turn signal light, and the message can include an indication of an intention for the vehicle to move to a particular lane, an indication of a particular exit to be used by the vehicle, and/or an indication of a road hazard in a particular lane.

The system can further include a second light emitter coupled to the vehicle. The ECU can be further configured to generate a second light pattern using the second light emitter to communicate the message to the adjacent vehicle using the communication protocol. The first light pattern can be a visible light pattern and the second light pattern can be a non-visible light pattern.

The system can further include a sensor coupled to the ECU, the ECU is further configured to detect, via the sensor, a light pattern emitted from the adjacent vehicle.

The light pattern from the adjacent vehicle can be configured to be processed by the ECU for controlling a state of the vehicle.

The state of the vehicle can include a speed of the vehicle, an acceleration of the vehicle, a deceleration of the vehicle, and/or a route of the vehicle.

In another aspect, the subject matter is embodied in a passenger vehicle communication system for communication between vehicles on a roadway. The passenger vehicle communication system includes a source vehicle on the roadway. The source vehicle includes a brake light coupled to a rear portion of the vehicle and configured to emit light in a direction opposite a travel direction of the source vehicle. The source vehicle further includes a first electronic control unit coupled to the brake light and configured to encode a message using a communication protocol to create a first light pattern and generate the first light pattern using the brake light to communicate the message to an endpoint vehicle. The passenger vehicle communication system further includes the endpoint vehicle on the roadway following the source vehicle by a distance. The endpoint vehicle includes a sensor oriented in the travel direction and configured to detect light emitted by the brake light. The endpoint vehicle further includes a second electronic control unit coupled to the sensor and configured to decode the message using the communication protocol, and control a rate of deceleration of the endpoint vehicle based upon the message.

These and other embodiments may optionally include one or more of the following features. The message can include a deceleration rate of the source vehicle. The communication protocol can be a binary protocol.

In another aspect, the subject matter is embodied in a method for vehicle-to-vehicle communication. The method includes receiving, by a first electronic control unit (ECU) coupled to a first vehicle, data indicating at least one of a vehicle condition, a passenger condition, or a roadway condition. The method further includes encoding, by the first ECU, a message that includes the data using a communication protocol to create a first light pattern. The method further includes generating, by the first ECU, the first light pattern using a first light emitter of the first vehicle to communicate the message to an adjacent vehicle. The first light emitter includes one of a head light for the vehicle, a tail light for the vehicle, a brake light for the vehicle, a hazard light for the vehicle, an infrared light for the vehicle, or a turn signal light for the vehicle.

These and other embodiments may optionally include one or more of the following features. The method further can further include detecting, by a sensor coupled to a second vehicle, the first light pattern from the first light emitter. The method further can further include decoding, by a second ECU coupled to the second vehicle, the message using the communication protocol. The method further can further include controlling, by the second ECU, a rate of deceleration of the second vehicle based upon the message.

The method further can further include generating, by the first ECU, the first light pattern using a second light emitter of the first vehicle to communicate the message to the adjacent vehicle. The second light emitter can be the infrared light. The first ECU can be configured to generate the first light pattern using the first light emitter and the second light emitter simultaneously.

The first light emitter can be one of a front-facing light emitter or a rear-facing light emitter.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Figure 1:
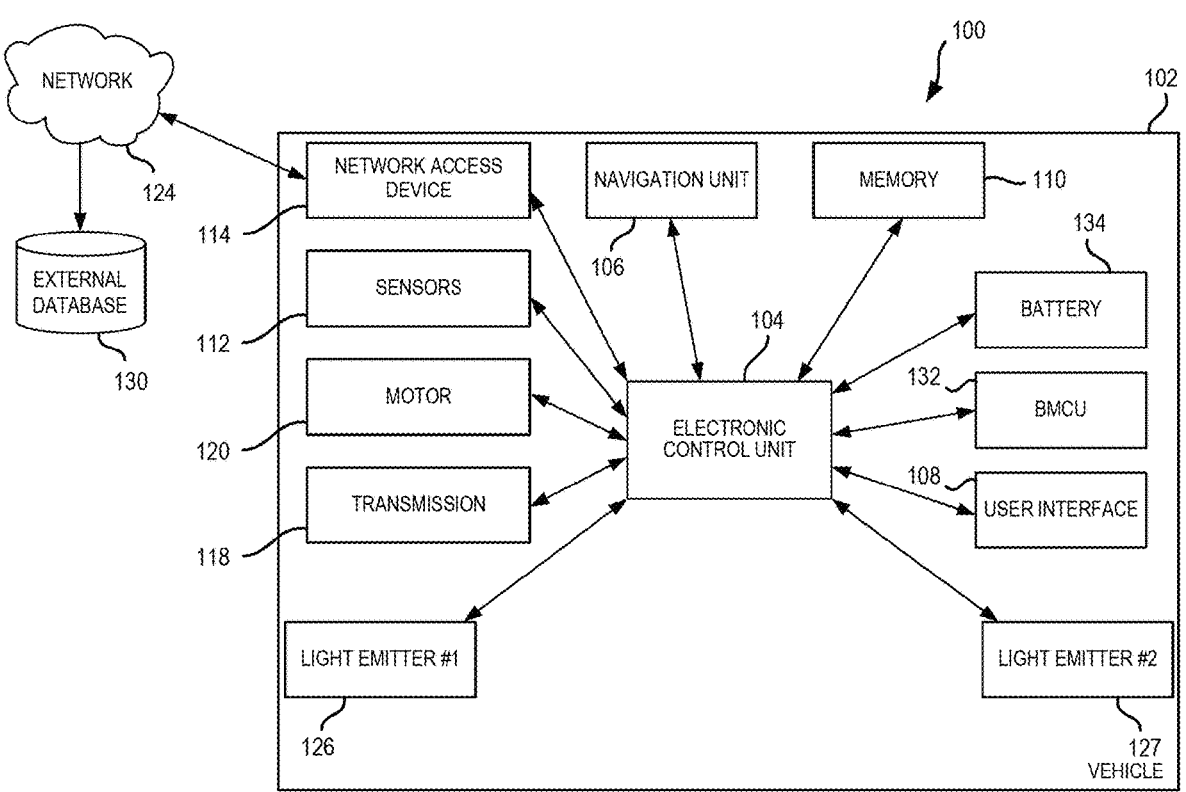
FIG. 1 is a block diagram of an example system for a vehicle according to an aspect of the invention.

Disclosed herein are systems, vehicles, and methods for vehicle-to-vehicle communication. Particular embodiments of the subject matter described in this disclosure may be implemented to realize one or more of the following advantages. Unlike previous systems, the vehicle-to-vehicle communication system uses vehicle lights (e.g., visible light and/or non-visible light such as infrared radiation) to communicate information to other vehicles on a roadway. The vehicle-to-vehicle communication system communicates a binary communication protocol (e.g., morse code, etc.) to send messages from a vehicle to other vehicles by using the vehicle lights to generate a light pattern. The vehicle-to-vehicle communication system can use existing vehicle lights (e.g., headlights, brake lights, etc.) to communicate messages via the binary communication protocol-encoded light pattern. The vehicle-to-vehicle communication system can use existing sensors to receive similarly encoded messages from a surrounding vehicle. Moreover, the vehicle-to-vehicle communication system can communicate the reason(s) why the vehicle is executing a maneuver via the encoded light pattern. Advantageously, the vehicle-to-vehicle communication system is capable of communicating to vehicles on the road that are not connected or part of a platoon.

Moreover, the vehicle-to-vehicle communication system compensates for latency problems between platooning vehicles. For example, if the latency between platooning vehicles is long, it may take several seconds for important messages to be wirelessly conveyed between platooning vehicles. To combat latency issues, a lead vehicle in a platoon may use its external lights and/or non-visible lights to communicate messages via a light pattern to a following vehicle. As an example, the lead vehicle can use its brake lights to communicate the rate of deceleration of the lead vehicle. Accordingly, the following vehicle can use the deceleration rate of the lead vehicle, as conveyed by the message, to slow down and avoid rear-ending the lead vehicle despite the latency. In addition to using visible and non-visible lights as a primary form of communication between vehicles, the vehicle-to-vehicle communication system may be used as a secondary, backup form of communication when platooning vehicles' primary form of communication is not working. For example, if the vehicle-to-vehicle communication system determines that the wireless connection between the vehicles has been lost or disrupted, the system can instead communicate messages via the light patterns with the vehicles' external lights and/or non-visible light sources.

The vehicle-to-vehicle communication system can control external vehicle lights to generate a light pattern with an encoded message for surrounding vehicles. The vehicle-to-vehicle communication system generates the light patterns in a manner that allows other vehicles on a roadway to receive messages through optical pattern recognition techniques. The message being communicated can be associated with the vehicle light that is generating the light pattern (e.g., a brake light-generated message indicating why or how fast a vehicle is braking, a head light-generated message indicating a rear-approaching emergency vehicle, a turn signal light-generated message indicating why the vehicle is changing lanes or that there is a hazard in a particular direction, a hazard light-generated message indicating why the vehicle's hazard lights are on, etc.).

As a further example of using existing vehicle lighting equipment to communicate morse code messages, the vehicle-to-vehicle communication system may use infrared lights (e.g., from a vehicle's infrared sensor) and/or other non-visible light sources to communicate messages when using visible lights is undesirable or unsafe. As such, other vehicles' sensors can identify the non-visible messages without the need to analyze visible light messages. In one approach, the system uses the non-visible and visible light sources simultaneously to provide encoded messages in two forms.

FIG. 1 is a block diagram of an example vehicle-to-vehicle communication system 100 (also referred to herein as a "system") for a vehicle 102. The system 100 includes one or more computers or electronic control units (ECUs) 104, appropriately programmed, to communicate with surrounding vehicles and to control the vehicle 102 in response to receiving communications from surrounding vehicles. The system 100 may include one or more sensors 112, a navigation unit 106, a user interface 108, and a memory 110. The system 100 may, for example, encode a message into a light pattern using a binary communication protocol. The system 100 may, for example, control a vehicle light to generate a light pattern whereby the message is communicated to an adjacent vehicle. The system 100 may, for example, receive a message from an adjacent vehicle via a received light pattern and the system 100 can decode the received light pattern and control an aspect of the vehicle (e.g., acceleration, deceleration, steering, a direction of travel, display the message, etc.) based upon the received message.

The system 100 may be included in a vehicle 102 and be connected to a network 124 that may assist in communicating with one or more sensors 112, the one or more external databases 130, or other components of the system 100. A vehicle 102 is a conveyance capable of transporting a person, an object, or a permanently or temporarily affixed apparatus. A vehicle 102 may be a self-propelled wheeled conveyance, such as a car, a sport utility vehicle, a truck, a bus, a van or other motor or battery driven vehicle. For example, the vehicle 102 may be an electric vehicle, a hybrid vehicle, a plug-in hybrid vehicle or any other type of vehicle. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may use one or more sensors 112 and/or navigation unit 106 to drive autonomously.

The vehicle 102 may be coupled to the network 124. The network 124, such as a local area network (LAN), a wide area network (WAN), a cellular network, a digital short-range communication (DSRC), the Internet, or a combination thereof, connects the vehicle 102, the one or more external databases 130 and/or components of the system 100. The external databases 130 may include databases from different service providers. A service provider may provide navigational map, weather, and/or traffic condition information to the vehicle 102.

A database is any collection of pieces of information that is organized for search and retrieval, such as by a computer, and the database may be organized in tables, schemas, queries, report, or any other data structures. A database may use any number of database management systems. An external database 130 may include a third-party server or website that stores or provides information. The information may include real-time information, periodically updated information, or user-inputted information. A server may be a computer in a network that is used to provide services, such as accessing files or sharing peripherals, to other computers in the network. A website may be a collection of one or more resources associated with a domain name.

Navigational map information may include a route that the vehicle 102 intends to travel. The route may include a starting location, a destination location and a path between the starting location and the destination location. The navigational map information may include terrain, political, traffic condition, roadway and/or construction information along the route. Political information includes political features such as cities, states, zoning ordinances, and laws and regulations, and traffic signs. Roadway information includes road features such the grade of an incline of a road and/or the boundaries of one or more lanes that make up the roadway. Construction information includes construction features such as construction zones and construction hazards. Traffic condition information includes one or more traffic condition features, such as a stop sign, traffic signal, traffic congested areas or accident areas. The traffic condition information may provide information related to the density and movement of vehicles on a roadway and/or accident locations. Traffic condition information may include real-time information of the traffic congested areas or accident areas. The real-time information may include the traffic in a particular lane. Terrain information may include terrain features, such as hills, flat terrains, or curves, and/or topographical information.

Features, e.g., terrain features, road features, political features, or traffic condition features, which may be derived from the terrain, roadway, political or traffic condition information, each have a location that may be identified by map coordinates. The map coordinates may be defined by latitude and longitudinal coordinates.

The vehicle 102 can include a transmission 118 operatively coupled to a motor 120. The vehicle 102 can further include a battery 134 and a battery management and control unit (BMCU) 132. The BMCU 132 may be coupled to the battery 134. The BMCU 132 may be coupled to the battery 134 and control and manage the charging and discharging of the battery 134. The BMCU 132, for example, may measure, using battery sensors (not shown), parameters used to determine the state of charge (SOC) of the battery 134. The battery 134 may include one or more rechargeable batteries.

In various embodiments, the motor 120 is an electric motor. In this regard, the motor 120 can be an electric motor and an electric generator that converts electrical energy into mechanical power, such as torque, and converts mechanical power into electrical energy. The motor 120 may be coupled to the battery 134. The motor 120 may convert the energy from the battery 134 into mechanical power, and may provide energy back to the battery 134, for example, via regenerative braking. The battery 134 may be coupled to the motor 120 and may provide electrical energy to and receive electrical energy from the motor 120. The BMCU 132 may prepare the battery 134 to discharge electrical energy to provide to the motor 120 to accelerate the vehicle 102.

In various embodiments, the motor 120 is an internal combustion engine (ICE). In this regard, the motor 120 can combust fuel to provide power to the vehicle 102. The motor 120 can combust fuel to provide mechanical power, such as torque, to the transmission 118. Accordingly, the motor 120 can cause the vehicle to accelerate, decelerate, or maintain a desired velocity. The motor 120 can include combinations of an ICE and/or an electric motor, such as for hybrid vehicle applications for example. One or more components (e.g., a torque converter) can be coupled between the motor 120 and the transmission 118 for transferring rotating power from the motor 120 to the transmission 118.

Other power sources may include other types of fuel cells, such as hydrogen fuel cells.

The vehicle 102 can include a plurality of externally-facing light emitters, such as a first light emitter 126 and a second light emitter 127. The first light emitter 126 and/or the second light emitter 127 can be an existing light emitter on the vehicle 102, such as a brake light, a head light, a running light, a turn signal light, a hazard light, a fog light, an infrared light (e.g., that is part of a vehicle camera with night vision), or any other suitable externally-facing light of the vehicle 102. The first light emitter 126 and/or the second light emitter 127 can be configured to generate a visible light and/or a non-visible light (e.g., an infrared radiation).

One or more sensors 112 are configured to detect a light pattern from an adjacent vehicle. The one or more sensors 112 can include a photosensitive sensor or element. For example, one or more sensors 112 may detect a light pattern at an area around the exterior of the vehicle 102, e.g., in front of or behind the vehicle 105, at a side of the vehicle 102, etc.

The one or more ECUs 104 may be implemented as a single ECU or in multiple ECUs. The ECU 104 may be electrically coupled to some or all of the components of the vehicle 102. The ECU 104 may be coupled to at least one of the navigation unit 106, the memory 110, the one or more sensors 112, the network access device 114, the first light emitter 126, and/or the second light emitter 127. The ECU 104 may include one or more processors or controllers specifically designed for controlling operations of the vehicle 102, such as generating a light pattern via the first light emitter 126 and/or the second light emitter 127. To generate a light pattern, the ECU 104 can send a power and/or control signal to the first light emitter 126 and/or the second light emitter 127 to cause the first light emitter 126 and/or the second light emitter 127 to illuminate to generate the light pattern. The ECU 104 may further control the receiving of messages from adjacent vehicles via the photo sensitive sensors 112. For example, the ECU 104 can decode light patterns received from adjacent vehicles to determine a received message. The ECU 104 can further control the vehicle 102 based upon a received message.

The memory 110 may be coupled to the ECU 104. The memory 110 may store instructions to execute on the ECU 104 and may include one or more of a RAM or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the ECU 104. The memory 110 may store vehicle parameters (e.g., vehicle weight, light emitter locations, communication protocol(s), etc.).

The network access device 114 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G or 4G). The network access device 114 may transmit data to and receive data from devices and systems not directly connected to the vehicle 102. For example, the ECU 104 may communicate with the external databases 130. Furthermore, the network access device 114 may access the network 124, to which the external databases 130 are also connected.

The one or more sensors 112 may be coupled to the ECU 104 and include a motion sensor, vehicle speed sensor, and/or one or more proximity sensors. The motion sensor measures the motion of the vehicle 102. The motion sensor may be an accelerometer, gyroscope, inertia measurement unit or other motion sensing device. The vehicle speed sensor measures the speed of the vehicle 102, for example, by measuring the total revolutions of the wheel per minute. The one or more proximity sensors may be positioned on the front, sides and/or rear of the vehicle 102 to detect surrounding vehicles and/or objects that are within a threshold distance of the vehicle 102 in the front, sides and/or back of the vehicle 102, respectively. The proximity sensor may use radar, sonar, LiDAR, a camera, vehicle-to-vehicle (V2V) communication or other means to detect and/or measure a distance to the other vehicles or objects. The one or more sensors 112 may include one or more cameras that may be used to identify a driver to determine a driver profile to be used as baseline for the driver behavior patterns. The one or more sensors 112 may include one or more cameras that may be used to identify a position of a driver's hand, head, and/or eyes. The one or more proximity sensors may be able to detect the speed and direction of travel of the one or more surrounding vehicles and/or the relative difference in speed and/or distance between two surrounding vehicles.

The navigation unit 106 may be coupled to the ECU 104 and provide vehicle information and/or navigational map information to the ECU 104. The navigation unit 106 may have or be connected to a Global Positioning System (GPS) device. The vehicle information may include the current position, location, direction of travel and/or speed of the vehicle 102.

The user interface 108 provides an interface to the driver and/or other occupant of the vehicle 102 to interact with or receive output from the ECU 104. The user interface 108 may have a user interface element, such as a touch-screen, button, knob, lever, pedal, graphical user interface, or other input/output device connected to the ECU 104 to provide input to the ECU 104 or output from the ECU 104, such as to display a notification or provide an indicator.

Figure 2:
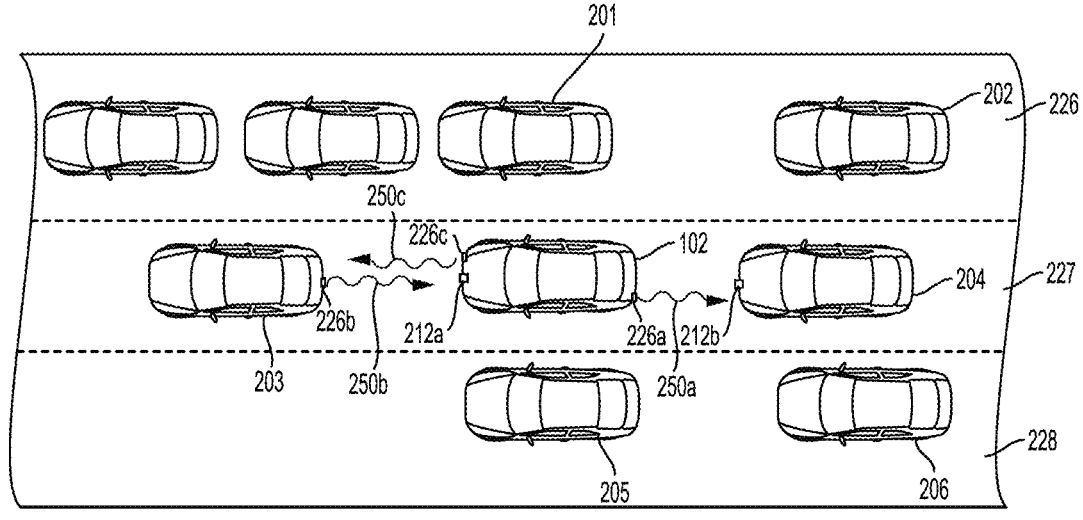
FIG. 2 shows an example illustration of a use case of when the system of FIG. 1 may be used for vehicle-to-vehicle communication according to an aspect of the invention.

FIG. 2 shows an illustration of a use case of when the system 100 of FIG. 1 communicates with one or more adjacent vehicles. FIG. 2 shows a vehicle 102 with the system 100 traveling on a roadway, such as a highway. The vehicle 102 is surrounded by one or more surrounding vehicles 201-206.

Figure 3:
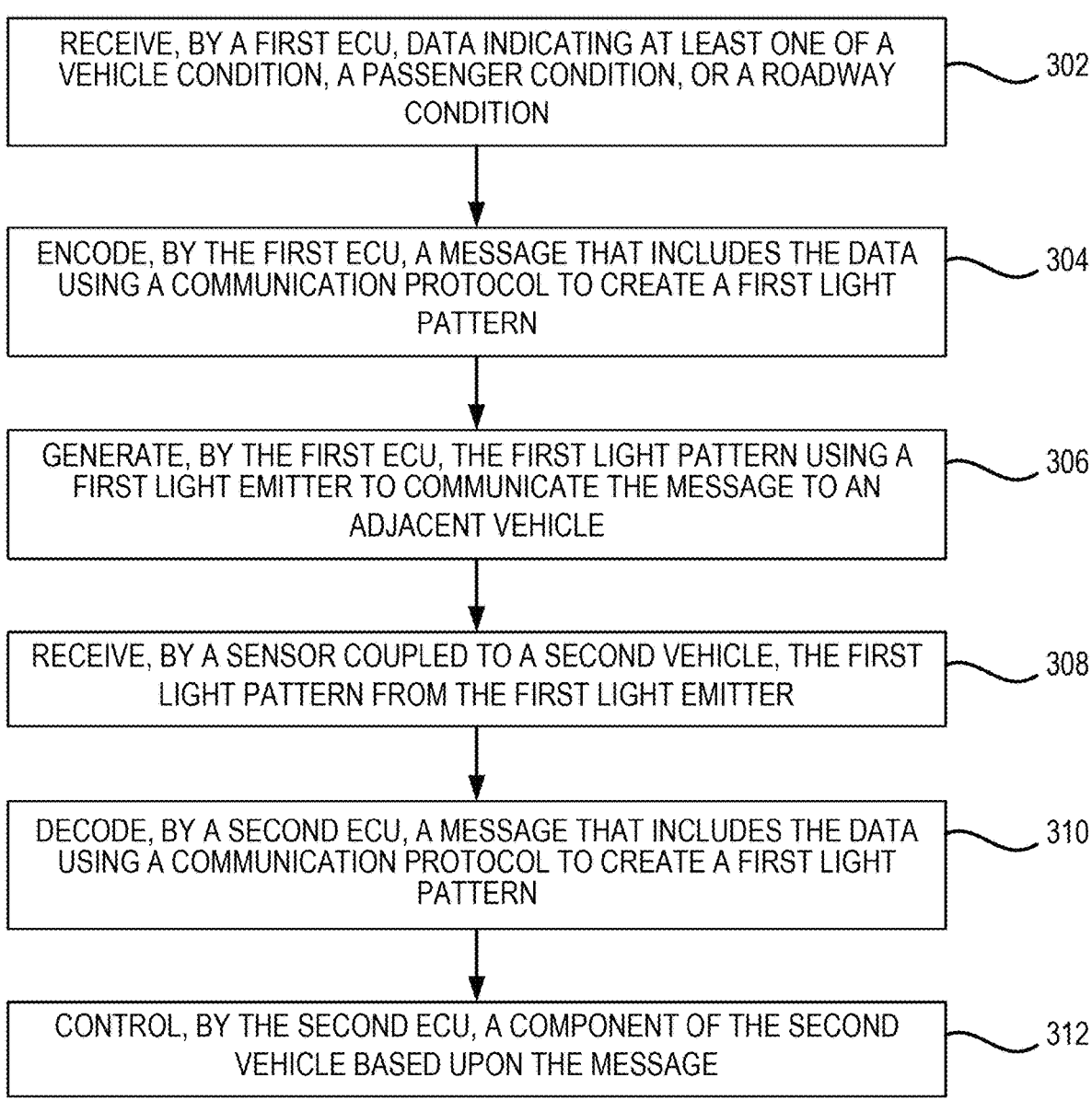
FIG. 3 is a flow diagram of an example process for vehicle-to-vehicle communication according to an aspect of the invention.

FIG. 3 is a flow diagram of an example process 300 for vehicle-to-vehicle communication. One or more computers or one or more data processing apparatuses, for example, the ECU 104 of the system 100 of FIG. 1, appropriately programmed, may implement the process 300. For ease of description, the process 300 is described below with reference to FIG. 1 and FIG. 2. The process 300 of the present disclosure, however, is not limited to use of the exemplary system 100 of FIG. 1 or the exemplary use case of FIG. 2.

With combined reference to FIG. 1, FIG. 2, and FIG. 3, the system 100 can receive or determine data (e.g., digital and/or analog information or data) indicating at least one of a vehicle condition, a passenger condition, or a roadway condition (step 302). A vehicle condition can include a condition of the vehicle 102, such as a speed of the vehicle 102, an acceleration value of the vehicle 102, a deceleration value of the vehicle 102, or an intent to maintain, accelerate, or decelerate a speed of the vehicle 102. Accordingly, the data can be received by the system 100 from a brake pedal sensor, an accelerator pedal sensor, a camera, a speed sensor, a GPS, or any other suitable device. A vehicle condition can include an intent of the vehicle 102 to change lanes or change a direction of travel. Accordingly, the data can be received by a GPS or a turn signal. Moreover, the vehicle condition can include a reason (e.g., to avoid an obstacle (e.g., a pothole), traffic is slowing down, etc.) for the vehicle condition. Accordingly, the data can be received by a camera, a GPS, an external database (e.g., weather conditions, traffic conditions, etc.), or any other suitable device. A passenger condition can include a medical condition of the passenger or any other condition of a passenger that is desirable to convey to surrounding vehicles. Accordingly, the data can be received by a camera, a microphone, etc. A roadway condition can include an indication of the presence of a roadway hazard or obstacle (e.g., pothole, disabled vehicle, water, ice, etc.), a level of traffic on the roadway (e.g., slow moving traffic, congested traffic, etc.), weather conditions, etc. Accordingly, the data can be received by a camera, a GPS, an external database (e.g., weather conditions, traffic conditions, etc.), or any other suitable device. Accordingly, one or more sensors 112 can indicate to the ECU 104 one or more of the aforementioned vehicle, passengers, or roadway conditions.

The system 100 can encode a message that includes the data using a communication protocol to create a first light pattern (step 304). For example, ECU 104 can use a binary communication protocol (e.g., morse code or any other suitable binary communication protocol) to generate a first light pattern 250*a* with the encoded data.

The system 100 can generate the first light pattern 250*a* using a first light emitter 226*a* of the vehicle 102 to communicate the message to an adjacent vehicle, such as vehicle 204 (step 306). The system 100 can deliver the data by selectively modulating and/or otherwise controlling the spatial distribution (e.g., pattern), amplitude, frequency, phase, polarization, angle, pulse width, duty cycle, and/or any other suitable characteristic of visible or traditionally non-visible light propagating through space. Accordingly, the vehicle-to-vehicle communication system facilitates free-space optical communication between vehicles from at least one "source vehicle" (or source device) to at least one "endpoint vehicle" (or endpoint device). Accordingly, the ECU 104 can control, according to the communication protocol, amplitude, frequency, phase, polarization, angle, pulse width, duty cycle, and/or any other suitable characteristic of the light pattern 250*a* to generate a binary communication protocol-encoded light pattern. In the illustrated example, the vehicle is using a rear-facing light emitter 226*a* (e.g., a brake light, a hazard light, a turn signal light, a backup light, etc.) to generate the light pattern 250*a*. In this regard, the light emitter 226*a* can be configured to emit light in a direction opposite a travel direction of the vehicle 102. Accordingly, the light pattern 250*a* can include a message (e.g., a message indicating a rate of deceleration, an upcoming road hazard, etc.) directed to vehicles (e.g., vehicle 204) located behind the vehicle 102. A side-facing light emitter(s) and/or front-facing light emitter(s) can also be used to communicate a message to a surrounding vehicle, as described herein.

Vehicle 204 can similarly be equipped with a system 100 as described with respect to FIG. 1. For example, the vehicle 204 can include one or more sensors 212*b*, such as a photo sensitive sensor, to continuously monitor the surrounding vehicles for a message communicated via a light pattern. For example, vehicle 204 can be equipped with a sensor 212*b* (which can be similar to the sensors 112 of system 100 as described with respect to FIG. 1). Various types of photo sensitive sensors that can be used by the system 100 include MSM photodetectors, photodiodes, phototransistors, charge-coupled devices, CMOS image sensors, and photomultiplier tubes.

The sensor 212*b* can detect the first light pattern 250*a* from the first light emitter 226*a* (step 308).

The second vehicle 204 (e.g., via a second ECU, similar to ECU 104 of FIG. 1, coupled to the second vehicle 204) can decode the message using the communication protocol (step 310). For example, the system can translate the message from a binary language to a human readable language.

The second vehicle 204 (e.g., via the second ECU) can control a component of the second vehicle 204 based upon the message (step 312). For example, the second ECU can control a rate of deceleration of the second vehicle 204, by applying a deceleration torque to the second vehicle 204, based upon the message indicating that the vehicle 102 is braking and/or slowing. Accordingly, the source vehicle 102 can communicate with the endpoint vehicle 204 via the system 100.

Having described communication between the source vehicle 102 and the endpoint vehicle 204, attention is now directed to communication between vehicle 203 (which can be a source vehicle) and vehicle 102 (which can also be an endpoint vehicle). The system 100 of vehicle 102 may use one or more sensors 212*a*, such as a photo sensitive sensor, to continuously monitor the surrounding vehicles for a message communicated via a light signal (e.g., light pattern 250*b*). For example, vehicle 102 can be equipped with a sensor 212*a* (which can be similar to the sensors 112 of system 100 as described with respect to FIG. 1). The sensor 212*a* can detect the light pattern 250*b* from the light emitter 226*b*. The vehicle 102 (e.g., via an ECU 104) can decode a message from the light pattern 250*b* using the communication protocol. The vehicle 204 (e.g., via the ECU 104) can control a component of the vehicle 102 based upon the message.

In various embodiments, the message in the light pattern 250 is associated with the light emitter generating the light pattern 250. In an example, the light emitter 226*c* is a head light, and the message includes a notification of a presence of an emergency vehicle and/or an intention of the vehicle to pass a lead vehicle. For example, the vehicle 102 can send the light pattern 250*c* to the lead vehicle 203 to notify the lead vehicle 203 of a presence of an emergency vehicle approaching from the rear of vehicle 102. The vehicle 102 can send the light pattern 250*c* to the lead vehicle 203 to notify the lead vehicle 203 of intention of the vehicle 102 to pass the lead vehicle 203. The vehicle 203 can then use this information to modify a component of the vehicle 203, such as to accelerate, change lanes, decelerate, or change a direction of travel.

In another example, the light emitter 226*a* is a brake light and the message includes a reason for a braking maneuver, a deceleration rate of the vehicle, a level of urgency in braking, and/or an indication of an upcoming road hazard. For example, the light emitter 226*a* can be a brake light and the message provided via the light pattern 250*a* includes a reason for a braking maneuver of the vehicle 102 (e.g., slowing traffic, pothole, obstacle, pedestrian, etc.). The light emitter 226*a* can be a brake light and the message provided via the light pattern 250*a* can include a deceleration rate of the vehicle 102. The vehicle 204 can then use this information to also decelerate at the same rate as the vehicle 102. The light emitter 226*a* can be a brake light and the message provided via the light pattern 250*a* can include a level of urgency in braking (e.g., to indicate a deceleration rate). The light emitter 226*a* can be a brake light and the message provided via the light pattern 250*a* can include an indication of an upcoming road hazard. The vehicle 204 can then use this information to also decelerate at the same rate as the vehicle 102 and/or to avoid the upcoming road hazard.

In another example, the light emitter 226*a* is a hazard light, and the message includes a reason for why the hazard light is activated, an indication of an upcoming road hazard, an indication of a medical emergency of a passenger in the vehicle 102, and/or an indication that the vehicle 102 is stopped. The vehicle 204 can then use this information to modify a component of the vehicle 204, such as to accelerate, change lanes, decelerate, or change a direction of travel. For example, the system 100 of the vehicle 102 may control or prompt the vehicle 102 to move into an adjacent lane 226, 228 from the current lane 227. Moreover, using the hazard lights can allow the vehicle 102 to communicate messages in situations where it would not be beneficial to use the vehicle's brake lights (e.g., not using the brake lights to avoid startling other drivers, etc.).

In another example, the light emitter 226*a* and/or the light emitter 226*c* is a turn signal light, and the message includes an indication of an intention for the vehicle 102 to move to a particular lane, an indication of a particular exit to be used by the vehicle 102, and/or an indication of a road hazard in a particular lane. The vehicle 204 (or the vehicle 203 when light emitter 226*c* is used) can then use this information to modify a component of the vehicle 204, such as to accelerate, change lanes, decelerate, or change a direction of travel.

Figure 4:
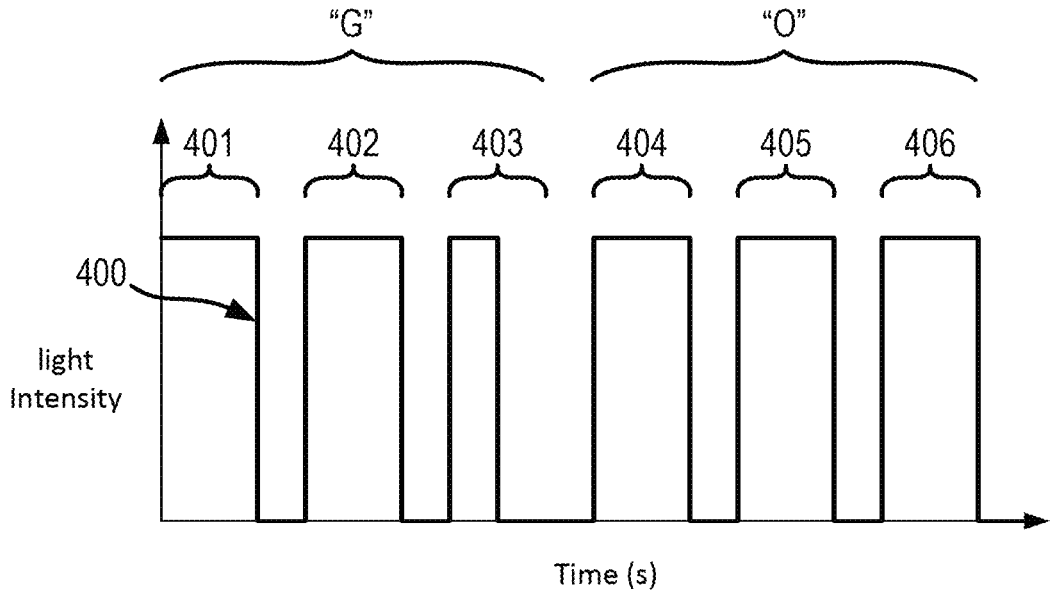
FIGS. 4 and 5 are example light patterns encoded using a binary communication protocol according to an aspect of the invention.

FIG. 4 is an illustration of a light pattern 400 with a message "GO" encoded using morse code. In the illustrated embodiment, the light pattern 400 includes a first dash 401 represented by a relatively long light pulse, a second dash 402 represented by a relatively long light pulse, a dot 403 represented by a relatively short light pulse, and three subsequent dashes 404, 405, 406 represented by a relatively long light pulses.

Figure 5:
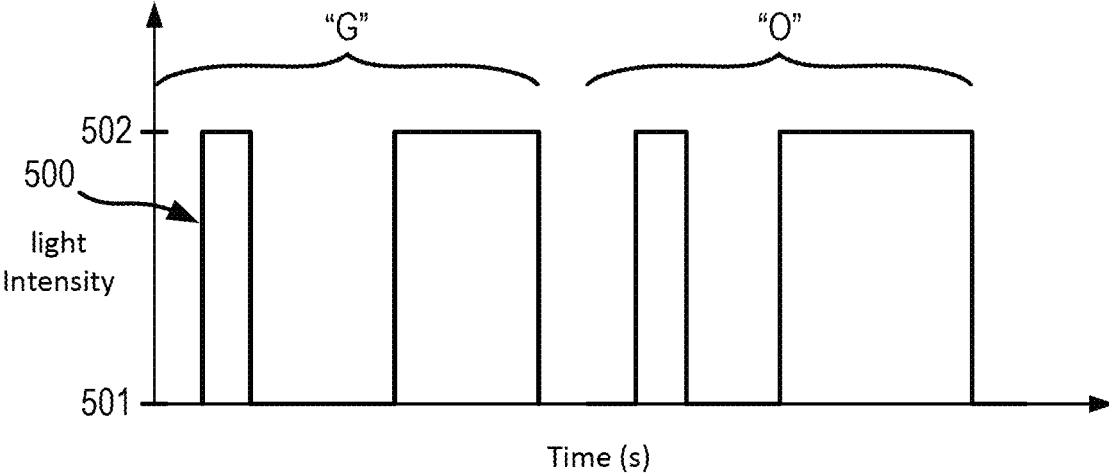

FIG. 5 is an illustration of a light pattern 500 with a message "GO" encoded using binary code. In the illustrated embodiment, the light pattern 500 includes binary numbers "01000111 01001111" encoded using light pulses, where a light pulse at a first intensity 501 represents a zero (0) and a light pulse at a second intensity 502 represents a one (1). In various embodiments, instead of varying light intensity to represent a different binary value, the amplitude, frequency, phase, polarization, angle, pulse width, duty cycle, and/or any other suitable characteristic of the light pattern 500 can be varied to encode the light pattern 500 with a binary communication protocol. Moreover, while the illustrated embodiments show the message "GO" encoded within the light pattern for ease of illustration, the light pattern can be encoded with any suitable message as described herein.

Accordingly, a message from a source vehicle can begin as a digital or analog signal, for example from a sensor. A message can begin as a human-readable message that is input into a system and converted into a digital or analog signal. The system 100 can encode the signal using the binary communication protocol to generate a binary signal. The binary signal can be converted into a light pattern using the light emitter(s). The endpoint vehicle can detect the light pattern and convert the light pattern into digital or analog data (e.g., a photo current having a magnitude in amperes that is comparable (e.g., similar to) to the intensity of the light pattern) which can then be decoded by the ECU using the binary communication protocol. The decoded message can be converted into a human-readable message and displayed to a human (e.g., via the user interface 108).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for vehicle-to-vehicle communication, the system comprising:

a first light emitter and a second light emitter coupled to a vehicle; and an electronic control unit (ECU) coupled to the first light emitter and the second light emitter and configured to:

encode a message using a binary communication protocol that employs on-off modulation of the first light emitter and the second light emitter, the binary communication protocol defining binary symbols that are represented by discrete illumination intervals and non-illumination intervals to create a first light pattern for the first light emitter and a second light pattern for the second light emitter, the first light pattern being a visible light pattern and the second light pattern being a non-visible, infrared, light pattern; and simultaneously generate the first light pattern using the first light emitter and the second light pattern using the second light emitter to communicate the message to an adjacent vehicle using the binary communication protocol, the message configured to be received by the adjacent vehicle using optical pattern recognition of the first light pattern.

2. The system of claim 1, wherein the first light emitter is configured to emit the visible light pattern.

3. The system of claim 2, wherein the second light emitter is configured to emit the non-visible, infrared, light pattern.

4. The system of claim 1, wherein the first light emitter is at least one of a head light for the vehicle, a running light for the vehicle, a brake light for the vehicle, a hazard light for the vehicle, or a turn signal light for the vehicle.

5. The system of claim 1, wherein the first light emitter is a head light, and the message includes at least one of:

a notification of a presence of an emergency vehicle; or an intention of the vehicle to pass a lead vehicle.

6. The system of claim 1, wherein the first light emitter is a brake light, and the message includes at least one of a reason for a braking maneuver, a deceleration rate of the vehicle, a level of urgency in braking, or an indication of an upcoming road hazard.

7. The system of claim 1, wherein the first light emitter is a hazard light, and the message includes at least one of a reason for why the hazard light is activated, an indication of an upcoming road hazard, an indication of a medical emergency of a passenger in the vehicle, or an indication that the vehicle is stopped.

8. The system of claim 1, wherein the first light emitter is a turn signal light, and the message includes at least one of an indication of an intention for the vehicle to move to a particular lane, an indication of a particular exit to be used by the vehicle, or an indication of a road hazard in a particular lane.

9. The system of claim 1, further comprising a sensor coupled to the ECU, the ECU is further configured to detect, via the sensor, a light pattern emitted from the adjacent vehicle, wherein the light pattern from the adjacent vehicle is configured to be processed by the ECU for controlling a state of the vehicle, the state of the vehicle includes at least one of a speed of the vehicle, an acceleration of the vehicle, a deceleration of the vehicle, or a route of the vehicle.

10. The system of claim 9, further comprising a user interface, wherein the ECU is configured to decode the light pattern received from the adjacent vehicle and translate the message from a binary language to a human-readable message for display via the user interface.

11. The system of claim 1, wherein the binary communication protocol is morse code.

12. The system of claim 1, wherein the first light emitter is selected from a head light for the vehicle, a running light for the vehicle, a brake light for the vehicle, a hazard light for the vehicle, or a turn signal light for the vehicle, and wherein the message includes vehicle-condition information corresponding to a function of the selected light emitter.

13. The system of claim 1, wherein the ECU encodes the message based on data indicating at least one of a vehicle condition, a passenger condition, or a roadway condition detected by one or more sensors coupled to the ECU.

14. A method for vehicle-to-vehicle communication, the method comprising:

receiving, by a first electronic control unit (ECU) coupled to a first vehicle, data indicating at least one of a vehicle condition, a passenger condition, or a roadway condition;

encoding, by the first ECU, a message that includes the data using a binary communication protocol that employs on-off modulation of a first light emitter and a second light emitter, the binary communication protocol defining binary symbols that are represented by discrete illumination intervals and non-illumination intervals to create a first light pattern; and generating, by the first ECU, the first light pattern as a sequence of light-on and light-off states using the first light emitter and the second light emitter simultaneously to communicate the message to an adjacent vehicle, the message configured to be received by the adjacent vehicle using optical pattern recognition of the first light pattern, and the first light emitter includes one of a head light for the vehicle, a tail light for the vehicle, a brake light for the vehicle, a hazard light for the vehicle, an infrared light for the vehicle, or a turn signal light for the vehicle and the second light emitter is the infrared light.

15. The method of claim 14, further comprising:

detecting, by a sensor coupled to a second vehicle, the first light pattern from the first light emitter;

decoding, by a second ECU coupled to the second vehicle, the message using the binary communication protocol; and controlling, by the second ECU, a rate of deceleration of the second vehicle based upon the message.

16. The method of claim 14, wherein the first light emitter is one of a front-facing light emitter or a rear-facing light emitter.

* * * * *